United States Patent [19]

Chudleigh, Jr.

[11] 4,058,809
[45] Nov. 15, 1977

[54] MTI SYSTEM AND METHOD

[75] Inventor: Walter H. Chudleigh, Jr., Paoli, Pa.

[73] Assignee: Control Data Corporation, Minneapolis, Minn.

[21] Appl. No.: 278,478

[22] Filed: June 26, 1972

[51] Int. Cl.$^2$ .............................................. G01S 9/42
[52] U.S. Cl. ............................... 343/7 A; 343/5 DP; 343/7 AG; 343/7.7
[58] Field of Search ...................... 343/5 DP, 7 A, 7.7

[56] References Cited

U.S. PATENT DOCUMENTS

| | | | |
|---|---|---|---|
| 3,467,961 | 9/1969 | Follen et al. | 343/7 A |
| 3,611,369 | 10/1971 | Maguire | 343/7 A |
| 3,680,095 | 7/1972 | Evans | 343/7 A |
| 3,707,718 | 12/1972 | Ames | 343/7.7 |
| 3,761,922 | 9/1973 | Evans | 343/7 A X |
| 3,786,506 | 1/1974 | Effinger et al. | 343/7 A |
| 3,983,556 | 9/1976 | Danzer et al. | 343/7 A |

*Primary Examiner*—T.H. Tubbesing
*Attorney, Agent, or Firm*—Burns, Doane, Swecker & Mathis

[57] ABSTRACT

An airborne early warning moving target indicator radar in which targets in the main beam having reflective characteristics sufficient to override side lobe attenuation are tracked relative to the side lobes and the residual doppler frequency for such targets resulting from side lobe detection calculated. Based on this calculation, the appropriate ones of a bank of doppler filters are inhibited at the appropriate range bin to prevent a false target indication without inhibiting the display of moving targets in the main beam at the same range but having different doppler frequencies. In addition to side lobe blanking, an automatic gain control circuit is provided in which the interpulse period is divided into a large number of equal time intervals on the order of 0.4 microseconds each to thereby separate the return signal from each radar pulse into a large number of range bins. The gain of a wide band return signal amplifier is separately adjusted for each range bin on the basis of the sampled amplitude of the return signal from the preceding radar pulse in the corresponding range bin to thereby provide optimum gain without saturating the return signal processor. A novel amplifier and method of digitally controlling the gain thereof is disclosed as is the superimposition of the gain adjustment transients of each stage of the amplifier.

66 Claims, 11 Drawing Figures

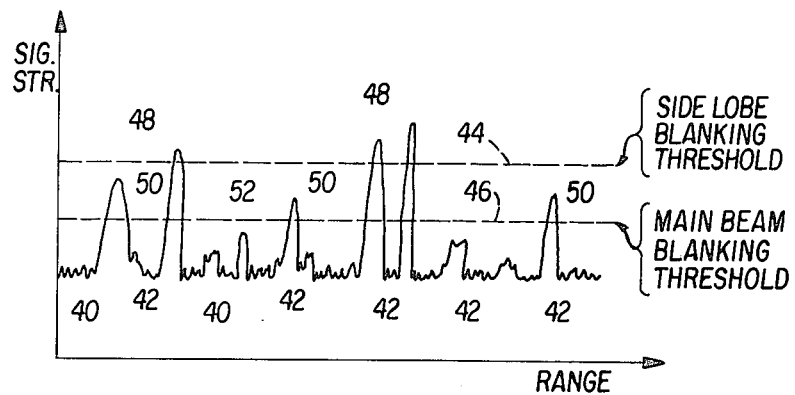
FIG.3
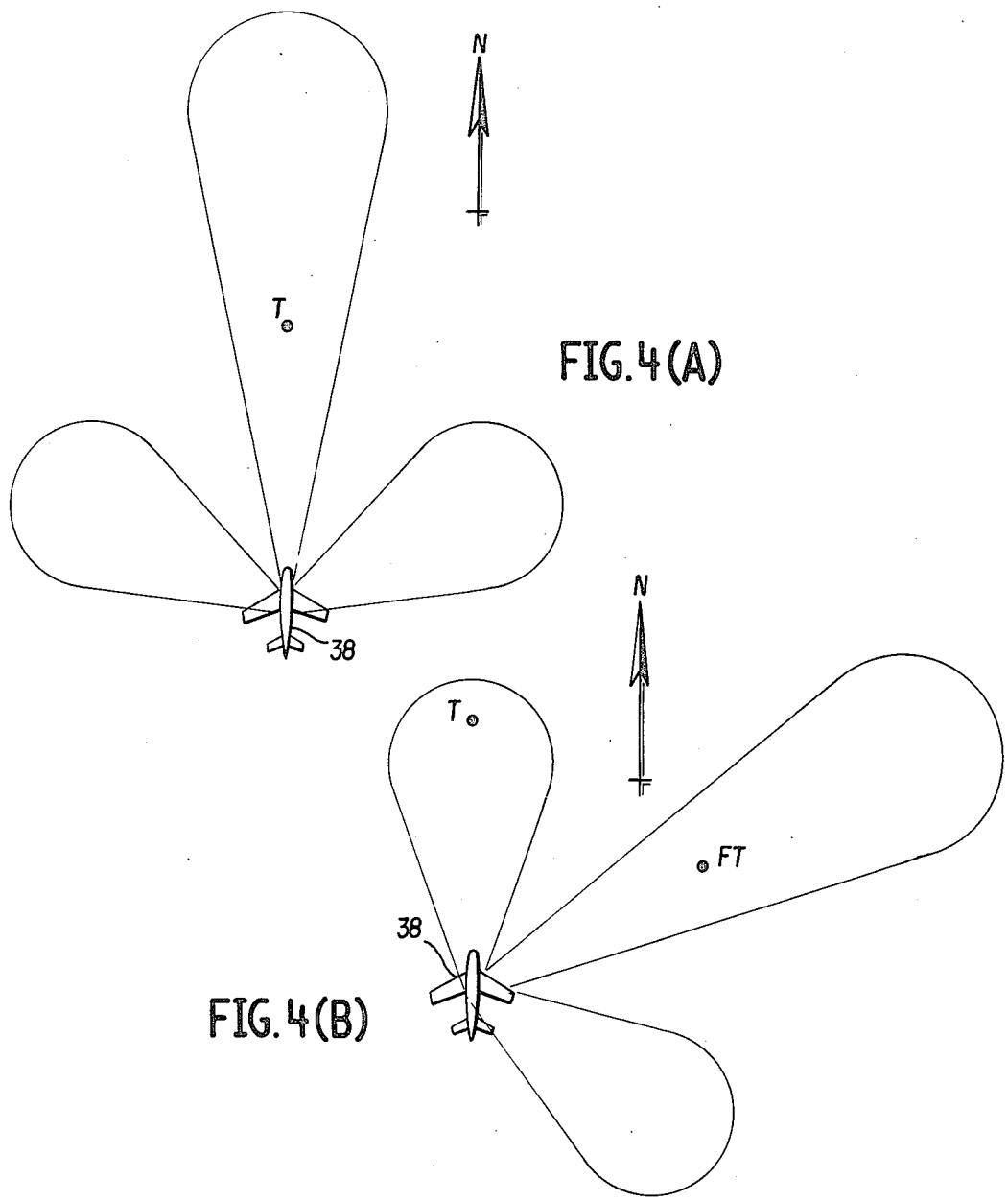
FIG.4(A)
FIG.4(B)

MTI SYSTEM AND METHOD

BACKGROUND OF THE INVENTION

The present invention relates to moving target indicators for an airborne early warning radar, and more specifically, to the method and apparatus for reducing false target indications in such systems.

With the rapid advance in the development of weapons delivery systems, the early detection of airborne targets is increasingly critical to a successful defense. Efforts to increase the range of surface based radars have encountered numerous problems. For example, low flying aircraft are often shielded by the horizon from surface antennae in high frequency line-of-sight radars, and the physical size of the antenna and the enormous power supplies necessary for the transmission of low frequency radar energy are significant practical limitations. An additional problem has been the atmospheric trapping of the radar energy due to temperature inversion and other atmospheric conditions.

To avoid these problems, the prior art has resorted to the use of radar pickets or outposts spaced from the defended area. By using aircraft as the radar platform for these outposts, the problem of atmospheric trapping is reduced, and higher frequency signals requiring less power and physical antenna size can be utilized due to the effective increase in the height of the antenna with respect to the horizon. However, while the clutter of ground and sea return is a limiting factor only at ranges in the order of 5 to 10 miles for upward looking and outward looking surface based radars, airborne downward looking radars are severely limited by the clutter. This problem is particularly acute where the target is in close proximity to the ground.

In blue water environments, these airborne early warning or AEW aircraft, through the use of a comparatively large antenna, a rather low speed platform and a high performance clutter cancellation circuit have been successful in reducing the display of radar energy reflected from the sea to a point where the system is effective.

Additional problems, however, arise in the overland environment in that the ground return from an enormous number of stationary reflectors, buildings, cliffs, fences and the like, may completely saturate the equipment and obscure the far smaller return from aerodynamically shaped and often much smaller targets such as aircraft. In the near land environment, the large return from the side lobes of the antenna is often sufficient to produce a "ring around" effect, thereby severely limiting the effectiveness of the system even when the main beam of the antenna is pointed at sea.

The prior art has utilized the concept of doppler frequency shift in the separation of the stationary from the moving targets. In these prior art moving target indicator (MTI) systems, the change in doppler frequency due to the speed of the radar platform, the wavelength of the energy transmitted, and the bearing of the reflector measured from the normal to the velocity vector are calculated or detected. These doppler frequencies are then attenuated by the radar signal processor to remove the return from ground targets in the main beam. It is necessary to continually retune the moving target doppler filters to attenuate the ground return doppler frequency bands associated with the antenna direction as the antenna rotates. This tuning operation is commonly referred to as TACCAR.

Stationary target echoes in the main beam of the antenna system have been detected on the basis of their amplitude relative to aircraft echoes as a 60 to 70 db difference in amplitude is comparatively frequent in many areas. Those echoes of sufficient magnitude to override the main beam clutter attenuation are clearly stationary and they are detected and the doppler filters inhibited at that range to prevent a main beam false alarm. This technique is generally known as main beam blanking.

A greater problem occurs with respect to side lobes. Main beam clutter is lower in power and narrower in doppler spectrum as the width of the main beam is narrowed, and main beam clutter can thereby be reduced. However, a reduction in the width of the main beam produces higher side lobes and thus more side lobe clutter.

The magnitude of the ground return signals from stationary targets is often so large relative to the desired moving target signals that the attenuation of the side lobes is also overcome and false alarms are generated. Once a known stationary target has been detected or identified as having sufficient strength to override the side lobe attenuation, the prior art system doppler filters have been inhibited at the calculated range to the target and the false alarm thus prohibited. Inhibiting the doppler filters at a given range unfortunately also precludes the detection of any target at that range, thus seriously reducing the effectiveness of the system.

The advent of increasingly complex and sophisticated offensive and defensive weapon systems and supersonic jet propelled aircraft has vastly increased the requirements of the radar return signal processors for accumulating the received data and for discriminating between false targets and real targets. In so doing, these radar processors have become extremely complex and sensitive to variations in the return signal strength.

Because of these highly sensitive signal processors which are necessary for reliable target discrimination, the magnitude of the difficulties described above have been significantly increased where the search area of the radar includes strong clutter creating area such as foliage, ocean waves and discrete ground reflectors such as buildings. These clutter producing objects can cause wide variations in the clutter signal strength and may produce target-like signals which exceed the dynamic range of the processor.

Prior efforts to reduce the effects of clutter have been directed primarily in the direction of limiting or clamping of the radar return signal to the dynamic range of the radar processors. This solution, however, is unsatisfactory since the limiting of the signal may also obscure much target information in the radar return signals, particularly where the targets are small and airborne.

The problem is especially acute in an airborne moving target indicator (AMTI) system in which the radar platform is itself an airborne aircraft and the doppler search radar is of the look-down type. Weight and physical size also impose practical limitations on the complexity of any system which must be airborne.

The amplitude of the clutter signals in an AMTI system varies widely with range and the foliage backscatter on such a radar return signal has been measured to vary as much as 40 dbs. Discrete objects such as buildings, etc. have been found to produce return signals which vary as much as 70 dbs in excess of adjacent return signals.

It is accordingly a general object of the present invention to minimize and obviate the problems of the prior art system and to provide an improved and novel AEW system having a look-down capability in overland and nearland environments.

It is another object of the present invention to provide a novel system having a reliable air traffic detection capability in a land-clutter environment.

It is still another object of the present invention to provide a novel method and apparatus for false alarm control in an AEW system suitable for automatic data processing equipment.

It is yet another object of the present invention to provide a novel method and apparatus for enhancing the detection range of an AEW radar system.

It is a further object of the present invention to provide a novel method and apparatus for reducing the susceptibility of AEW aircraft moving target indicators to interference and jamming, and to elevate the reliability and increase the ease of maintenance of known AEW moving target indicating systems.

It is yet a further object of the present invention to provide a novel method and apparatus for the automatic detection and tracking of small airborne targets flying over urban terrain and for the suppression of fixed target clutter.

It is another general object of the present invention to provide a novel method and amplitude adjustment system for optimizing target discrimination by a radar processor.

It is another object of the present invention to provide a novel method and automatic gain control system for radar return signal processors which dynamically adjusts the amplitude of the radar return signals to match the dynamic range of the radar processors.

It is still another object of the present invention to provide a novel automatic gain control method and system in conjunction with a wide band amplifier, the gain control system being effective to adjust the gain of the amplifier during the time the return signal is being received.

It is a further object to provide a novel method and system wherein the interpulse period is divided into several hundred or more time intervals each less than a microsecond in duration to thereby effectively divide the radar return signal into range bins, and to control the amplification of the radar return signals in the other range bins. The amplification for each of the range bins is related to the amplitudes of the radar return signals for the corresponding range bins of previous radar return signals.

It is still a further object to provide a novel system including a wide band amplifier and method in which the transients generated by the adjustment of the gain of the cascaded amplification stages are superimposed onto the same portion of the signal being amplified.

Yet a further object is to provide a novel system including an automatic gain control circuit and method in which the discrete gain adjustment of the amplifier for different portions of the signal is responsive, within predetermined limits, solely to the sampled amplitude of the same portion of the return signal which immediately preceded the return signal being amplified.

Yet still a further object is to provide a novel method and system for eliminating moving targets in the radar mapping of overland areas.

Yet still a further object of the present invention is to obviate the need for main beam blanking in MTI radar systems through the use of a novel automatic gain control circuit.

These and many other objects and advantages of the present invention will be readily apparent to one skilled in the art to which the invention pertains from the claims and from the following detailed description when read in conjunction with the appended drawings.

THE DRAWINGS

FIG. 3 is an expanded A-scope presentation of ground return from an urban area illustrating the operation of the main beam and side lobe blanking circuits of the system of FIG. 2;

Figure 2:
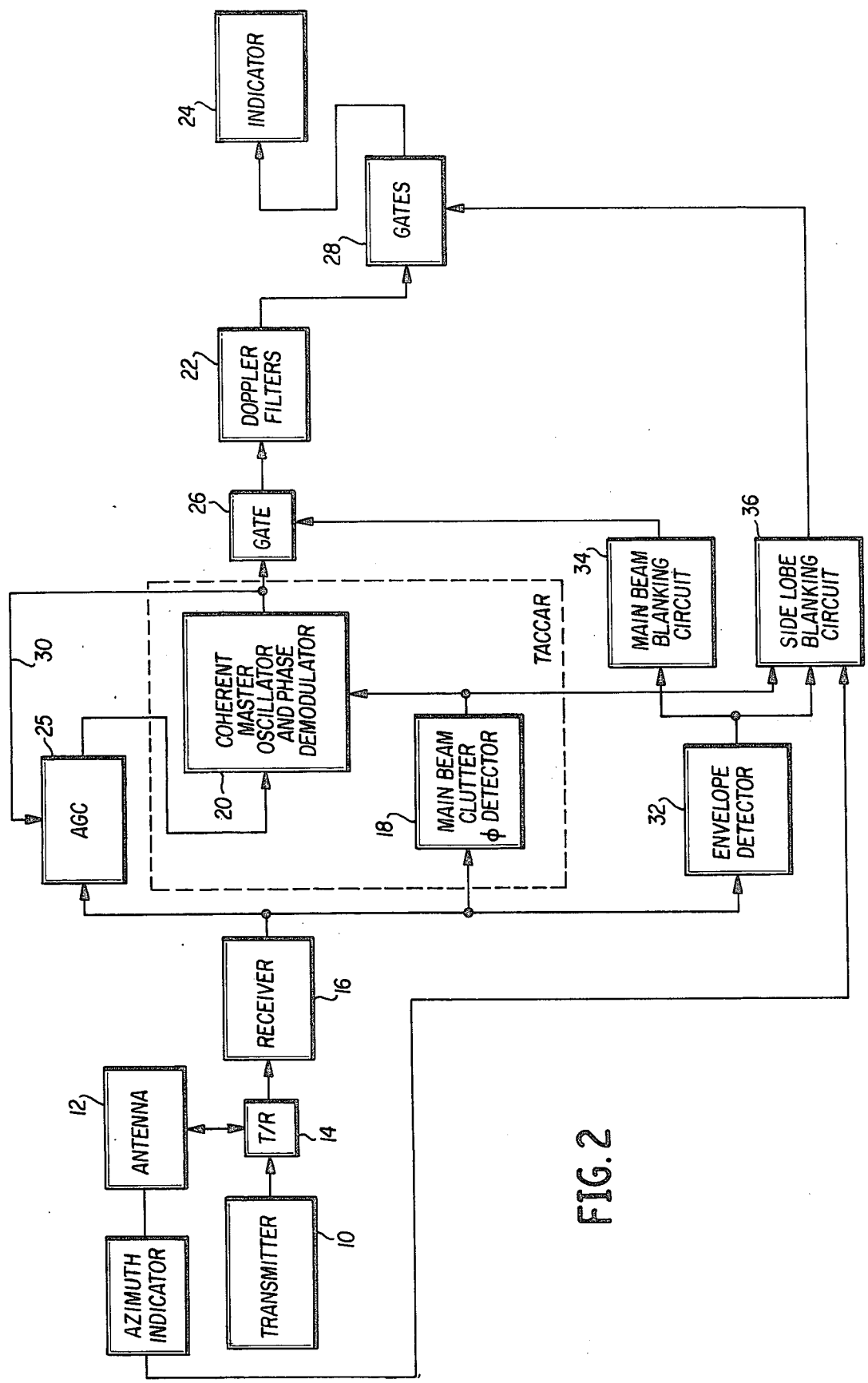
FIG. 2 is a schematic block diagram of the system of the present invention.
Figure 5:
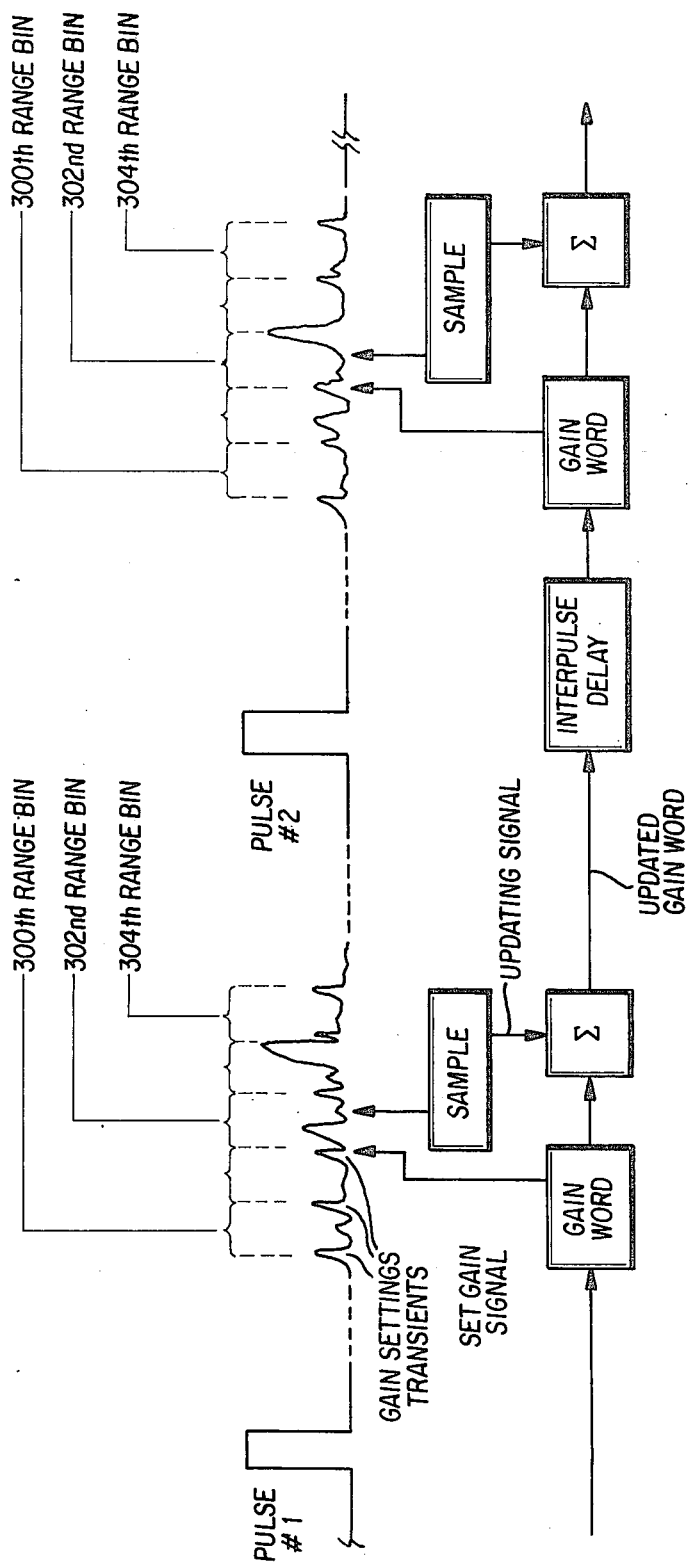
Figure 6:
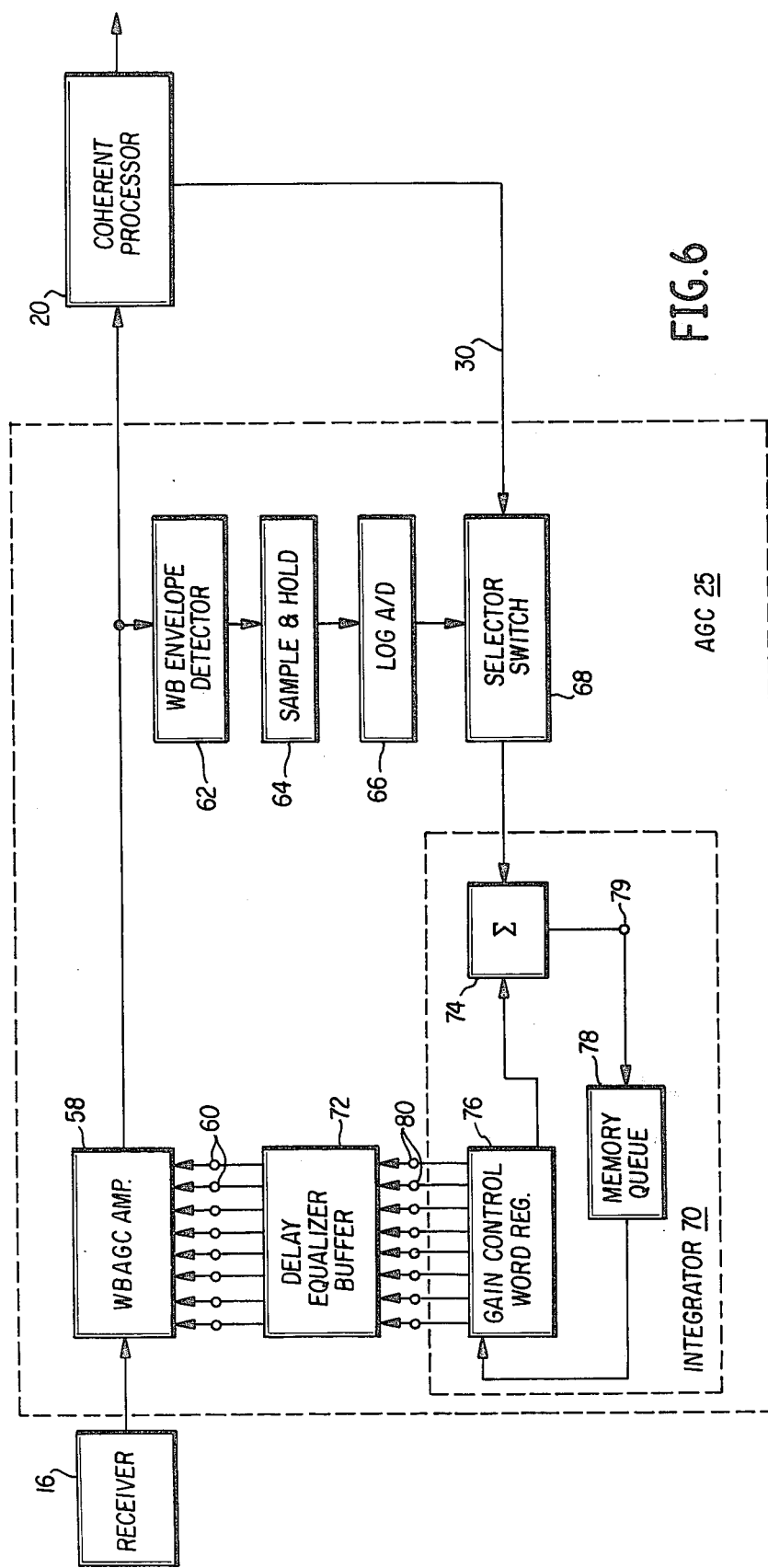
Figure 7:
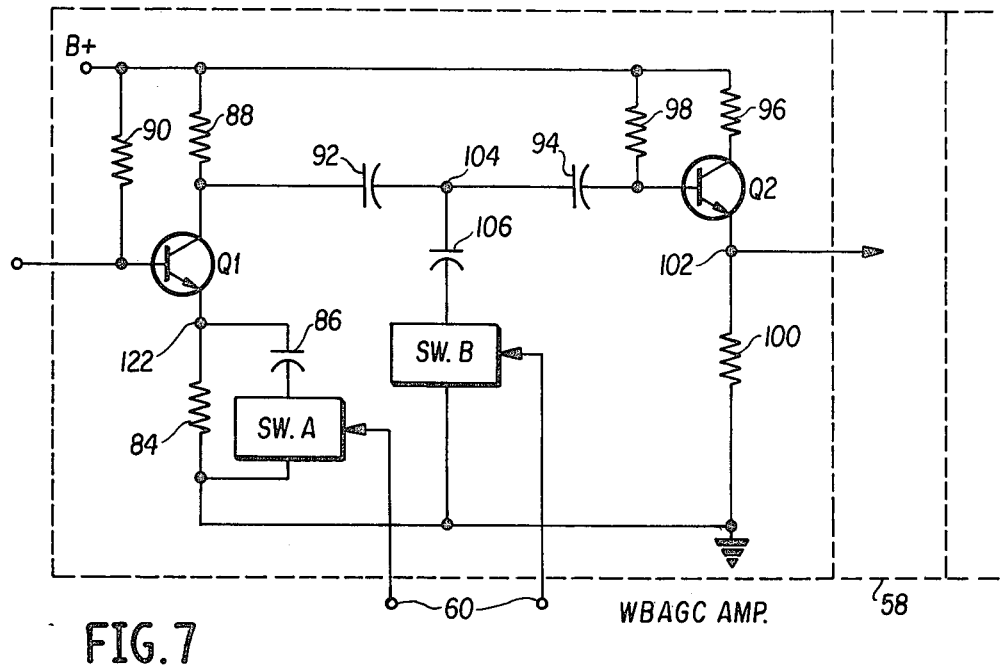
Figure 8:
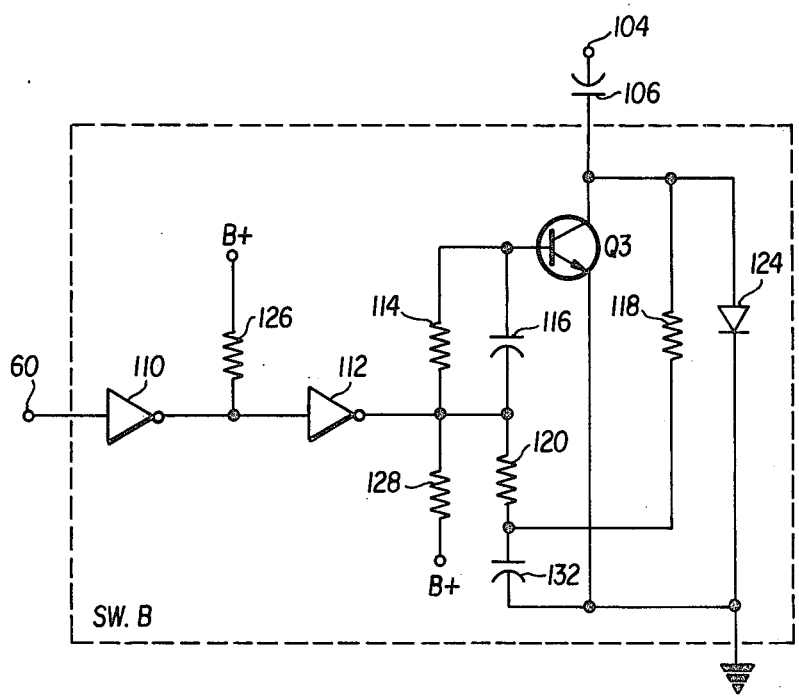
Figure 10:
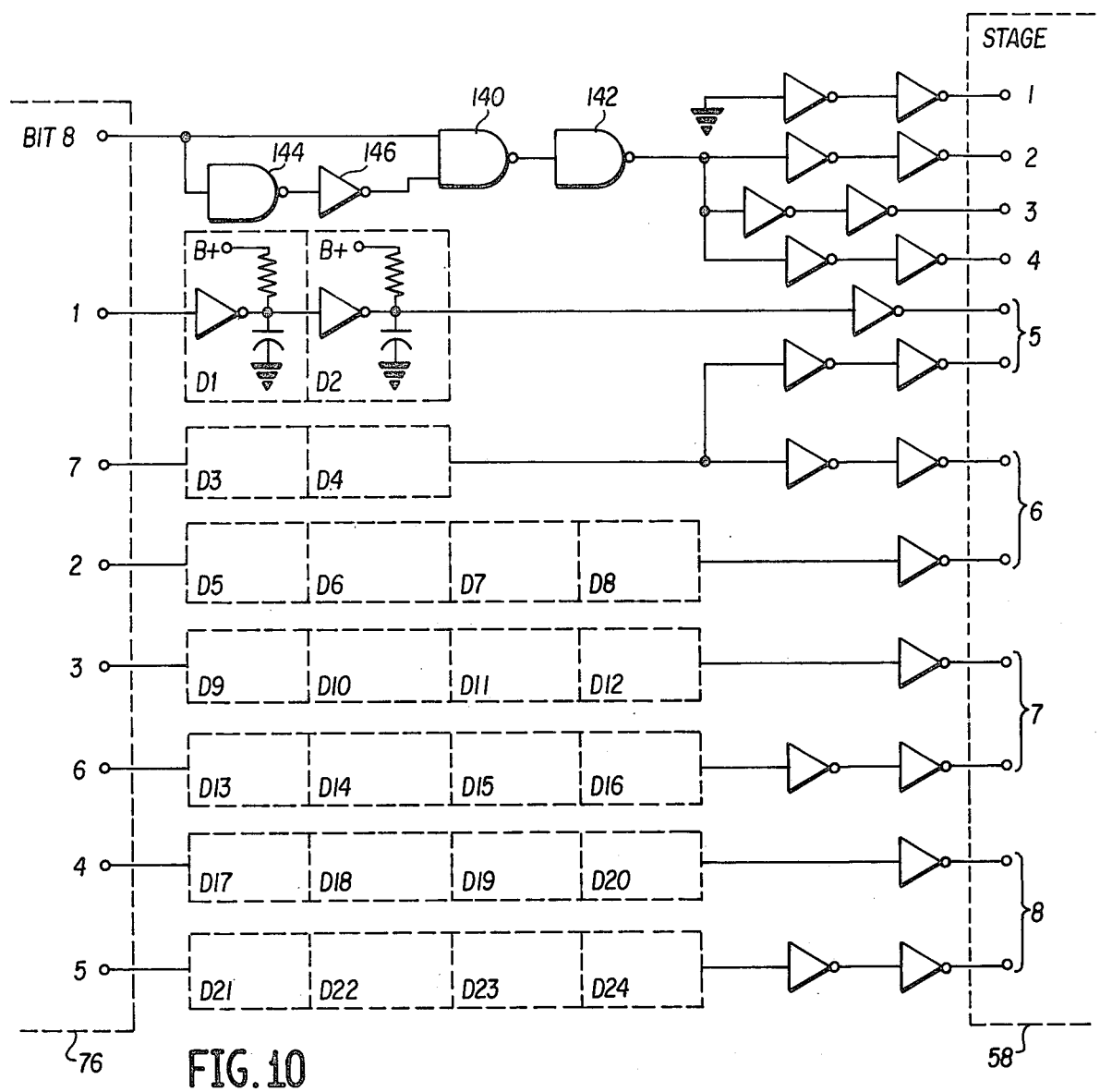
Figure 9:
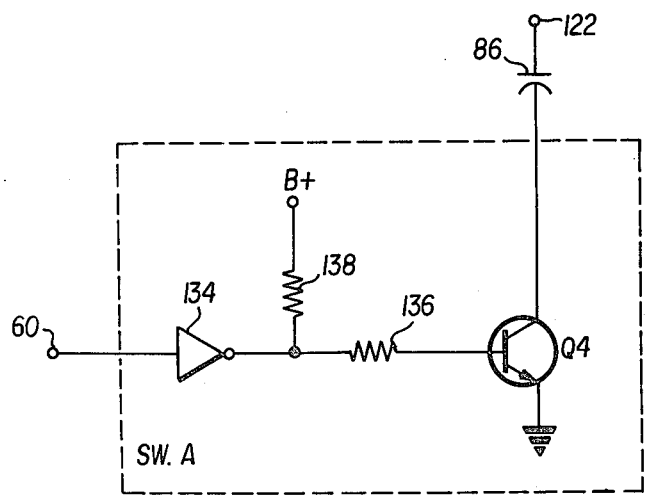

FIGS. 4(A) and 4(B) are a diagrammatic illustration of side lobe blanking technique of the present invention;

FIG. 5 is a diagrammatic illustration of the operation of the automatic gain control (AGC) circuit of the system of FIG. 2;

FIG. 6 is a detailed block diagram of the AGC circuit of the system of FIG. 2;

FIG. 7 is a schematic diagram of one amplifying stage of the wide band automatic gain control amplifier of FIG. 5;

FIG. 8 is a schematic circuit diagram of the switch B of FIG. 7;

FIG. 9 is a schematic circuit diagram of switch A of the circuit of FIG. 7; and, FIG. 10 is a schematic drawing of the delay equalizer buffer of the circuit of FIG. 6.

THE DETAILED DESCRIPTION

The present invention may be understood by reference to the drawings as above identified and further discussed in the order set out in the following Table of Contents:

TABLE OF CONTENTS

I. Prior Art MTI Systems (FIG. 1)
II. General System Description (FIG. 2)
III. Side Lobe Blanking (FIGS. 3 and 4)
IV. Automatic Gain Control (FIGS. 5-10)
   A. Theory of Operation (FIG. 5)
   B. AGC System Description (FIG. 6)
      1. The Integrator (FIG. 6)
      2. Synchronism
      3. WBAGC Amplifier (FIGS. 7-9)
      4. Transient Superimposition (FIG. 10)
V. Advantages and Scope of Invention

I. Prior Art MTI Systems (FIG. 1)

Figure 1:
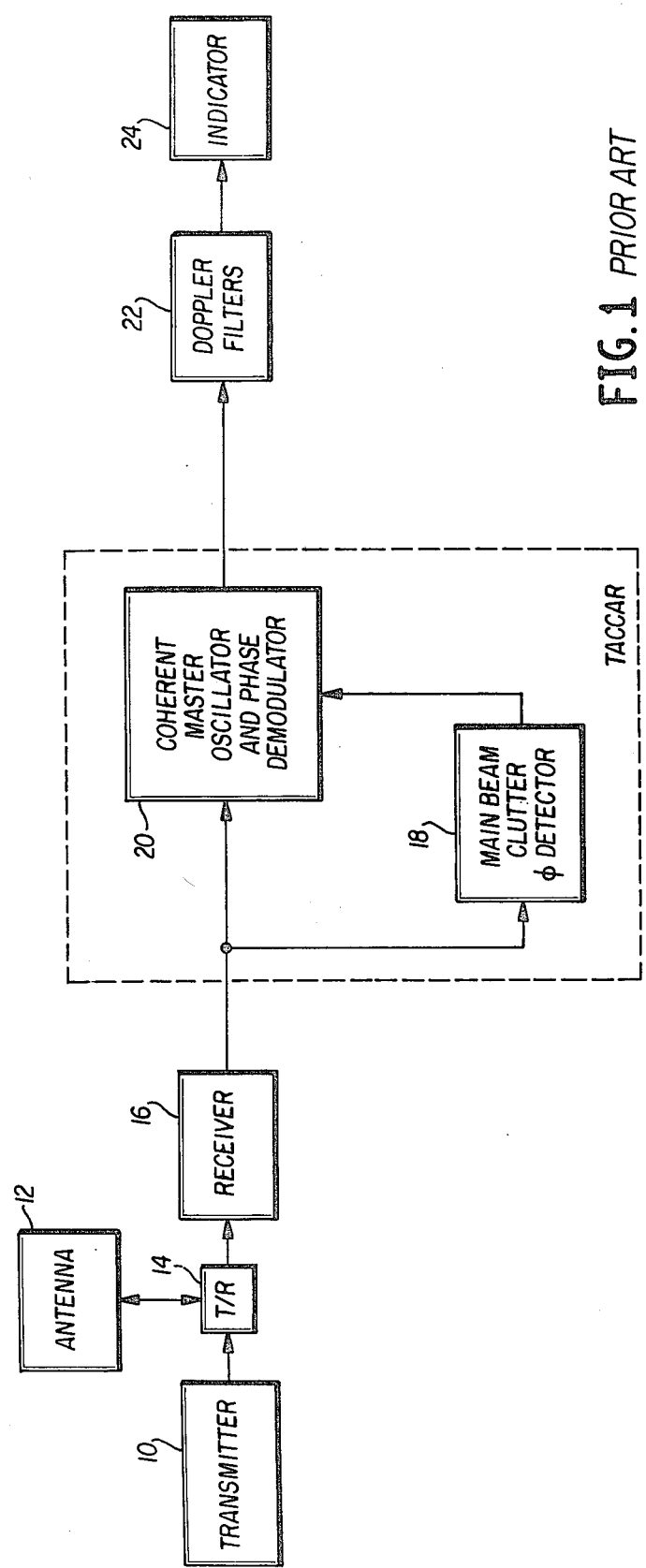
FIG. 1 is a schematic block diagram of a prior art AEW moving target indicator.

Referring now to the prior art AEW system illustrated in the schematic block diagram of FIG. 1, energy from the transmitter 10 is fed to the antenna 12 through a conventional transmit-receive or T-R switch 14, and the reflected energy received by the antenna 12 is transmitted through the T-R switch 14 to the radar receiver 16 in a conventional manner.

The phase of the main beam clutter signal is detected in a phase detector 18 and the output signal therefrom utilized to tune or adjust the frequency of the output signal from a coherent master oscillator and phase demodulator 20 to which the output signal from the radar receiver 16 is fed. In this fashion, the doppler phase shift introduced by the movement of the radar platform and the bearing of the reflector from the normal to the velocity vector may be removed from the radar signal.

As above described, any doppler phase shift in the output signal from the coherent master oscillator and phase demodulator 20 should be a phase shift introduced by movement of a target within the radar beam. This output signal may be applied through a bank of doppler filters 22 to a suitable conventional indicator 24.

However, the basic problems to which the present invention is directed and which result from the difference in the magnitude of moving and stationary targets and from the limited dynamic range of the signal processor remain.

II. Basic System Description (FIG. 2)

With reference now to the present invention as illustrated in the basic system schematic block diagram of FIG. 2 where like numerical designations have been retained for like components, energy from the transmitter 10 is fed to the antenna 12 through a T-R switch 14, and reflected energy received by the antenna 12 is in turn fed through the T-R switch 14 to the radar receiver 16 in the conventional manner described in connection with the prior art system illustrated in FIG. 1.

The output signal from the radar receiver 16 is fed through an automatic gain control circuit (AGC) 25, subsequently to be described in detail in connection with FIGS. 5-9, to a coherent master oscillator and phase demodulator 20 and the output signal therefrom is fed through a gate 26, a bank of doppler filters 22, and a second gate 28 to the indicator 24 earlier described in connection with FIG. 1. As will be explained hereinafter, a feedback path 30 may be provided between the coherent oscillator-demodulator 20 and the AGC 25 to limit the AGC output signal to the dynamic range of the oscillator-demodulator 20.

As in the earlier described prior art system, the output signal from the radar receiver 16 is also fed to the main beam clutter phase detector 18 of the type earlier described in connection with FIG. 1, and the output signal therefrom utilized to tune the frequency of the output signal from the coherent master oscillator and phase demodulator 20 to remove the doppler phase shift introduced by movement of the radar platform and antenna bearing relative to the line of flight.

With continued reference to FIG. 2, the output signal from the radar receiver 16 is also fed to an envelope detector 32 where the discrete return signals of a magnitude of sufficient size to override the side lobe attenuation or to cause saturation of the receiver are detected. The output signal from the envelope detector 32 may be utilized in a main beam blanking circuit 34 to inhibit the gate 26 between the coherent master oscillator and phase demodulator 20 and the bank of doppler filters 22 during the period when a discrete ground return or other return signal detected in the main beam is sufficient in amplitude to exceed a predetermined level.

The circuit thus described gives a display on indicator 24 which is free from saturating signals and thus is desirable in many applications where the targets of interest are small objects such as aircraft.

Thus, the return signal data from the coherent master oscillator and phase demodulator 20 is not fed to the bank of doppler filters 22 for those range bins at which a return signal of excessive amplitude occurs. Gating the signal input to doppler filters 22 for a given range bin will prevent the passage of a signal to the indicator 24 and target indication will not be registered. However, such targets when in the same range bin will also be not displayed on indicator 24 during the period when main beam blanking circuit 34 provides a gating signal to gate 26.

The main beam blanking circuit 34 and gate 26 may be disconnected from the system as above described through the utilization of the AGC 25 as will subsequently be described in more detail in connection with FIGS. 5-9.

The output signal from the envelope detector 32 is also fed to a side lobe blanking circuit 36 and the output signal therefrom utilized to selectively inhibit the one of the gates 28 associated with the appropriate one of the doppler filters 22 when the signal strength of a discrete ground return is sufficient not only to overcome the threshold of the main beam blanking circuit 34 when the target is in the main beam, but also sufficient to override the normal attenuation of the side lobes and to enter the system through the side lobes as a false target in the main beam.

In addition, the side lobe blanking circuit 36 calculates the residual doppler phase shift of these targets after processing in the coherent master oscillator and phase demodulator 20 utilizing antenna pointing and doppler data from the TACCAR circuit or from an inertial navigator (not shown in FIG. 2). This residual doppler phase shift results from detection in the side lobes while the master oscillator is being tuned for main beam location. In this manner, only the doppler filter which would pass a signal of the calculated doppler frequency of the false target is inhibited for that range bin. This leaves the remainder of the filters in the bank of doppler filters 22 in operation for the detection of moving targets in the main beam in that same range bin.

III. Side Lobe Blanking

Perhaps a more complete understanding of the side lobe blanking portion of the present invention may be gained from FIGS. 3, 4A and 4B. As illustrated in FIG. 3 wherein an expanded portion of an A-scope presentation of the output signal from the radar receiver 38 is illustrated, the clutter consists of an average or distributed clutter indicated generally at 40. This average clutter is random, has an approximate Gaussian character, and is highly repetitive on a sweep-to-sweep basis. The signal also contains a number of point source or discrete returns indicated generally at 42. These signals contain a small percentage of the total energy of the signal but indicate a much greater reflective power of the target.

Those discrete return signals 52 which do not exceed in amplitude the main beam blanking threshold 46 are within the suppression capability of the side lobe attenuation of the antenna system and the doppler filters are not inhibited. Those discrete return signals 48 and 50 of sufficient magnitude to exceed the main beam blanking threshold level 46 are utilized to generate in main beam blanking circuit 34 a signal which inhibits the gate 26 of FIG. 2 to prevent a target signal from being displayed by indicator 24. However, those discrete return signals 48 in the clutter which also exceed the side lobe blanking threshold 44 are fed to the side lobe blanking circuit 36 and stored.

The side lobe blanking circuit 36 tracks these discrete ground returns 48 and calculates from this stored data not only the range of each of these discrete sources but also the residual doppler phase shift which will result from the energy entering the system from the side lobes rather than the main beam. The gate 28 associated with the appropriate one of the doppler filters 22 may then be inhibited for that particular range bin so that false targets will not be indicated. In this manner, the remaining ones of the doppler filters 22 may detect, at the same range bin, a moving target in the main beam having a different doppler frequency.

The tracking of the discrete ground returns of a predetermined magnitude relative to the position of the side lobes of the rotating antenna beam, and the calculation of the residual doppler frequencies may be accomplished by any suitably programmed, general purpose computer, or by a special purpose computer, the design of which is within the state of the art. The use of a special purpose computer is desirable because of the limited functions to be performed and because of the considerations of weight and physical size.

Reference may also be had to the copending applications Ser. No. 282,073 of Glenn W. Preston et al entitled "MTI System Processor and Method," and filed Aug. 21, 1972 Ser. No. 278,479 of Walter H. Chudleigh, Jr. entitled "Automatic Gain Control Circuit and Method", filed concurrently herewith, now U.S. Pat. No. 3,944,942, assigned to the assignee of the present invention, and hereby incorporated herein by reference.

With reference to FIG. 4(A), an AEW aircraft 38 is illustrated on a due north course with the main beam of the antenna directed due north and a pair of side lobes directed generally east and west. A target T detected in the main beam of sufficient size to produce a signal such as that illustrated as return 50 in FIG. 3 will exceed the main beam blanking threshold 46 and result in the inhibition of the gate 26 by the main beam blanking circuit of FIG. 2. If the return from the target T of FIG. 4(A) provides a signal such as that illustrated as return 52 in FIG. 3, neither blanking threshold 44 nor 46 will be exceeded and neither gate 26 nor the doppler gates 28 of FIG. 2 will be inhibited.

Should, however, the return from the target T in the main beam as illustrated in FIG. 4(A) be like that of return 48 of FIG. 3, i.e., greater than the main beam threshold 46 and also greater than the side lobe threshold 44, the target T will produce a false echo when the antenna rotates clockwise to the position illustrated in FIG. 4(B). A target T of this size will produce a return signal to falsely indicate that a target FT exists generally east of the aircraft 38, i.e., the direction that the antenna is then pointing, when in fact no target exists in that position.

To eliminate such false targets, the side lobe blanking circuit of FIG. 2 calculates the doppler frequency which the return signal will have when detected in the side lobe and inhibits the appropriate one of the gates 28 in the appropriate range bin. Other targets detected in the main beam signal at that range bin will still be displayed by virtue of the difference in doppler unless it happened to have a velocity that would give it a doppler frequency corresponding to the doppler filter that was inhibited by the side lobe blanking circuit.

The function of the Automatic Gain Control (AGC) circuit 25 of FIG. 2 is to adjust the gain of an amplifier on a range bin-by-range bin basis, in accordance with the amplitude of the radar return signal. The gain will be comparatively small for range bins near to the antenna and greater for range bins which are further from the antenna. For any particular radar pulse return signal, the gain of the amplifier will be set for each range bin in accordance with the amplitude of the return signal in each range bin from previous radar pulse return signals.

An understanding of the operation of the AGC circuit 25 may be gained with reference to FIGS. 5-10.

A. Theory of Operation

With reference to FIG. 5 where radar transmitter pulses Nos. 1 and 2 are illustrated, the time interval between pulse No. 1 and pulse No. 2 is commonly referred to as the interpulse period and may correspond to the time interval during which a radar return signal is received from a target at the outer range limit of the radar, for example, 250 miles. After a brief quiescent period following the transmitter pulse, the return signal from each pulse is divided into a plurality of range bins corresponding to the conventional range discrimination networks of the radar by dividing the interpulse period into a plurality of discrete time increments.

As shown in the upper portion of FIG. 5, the range bins defined by the discrete time increments are shown between vertical dashed lines with brackets identified as the 300th range bin, 302nd range bin and 304th range bin. The entire radar return signal will contain a large number of range bins starting with No. 1 and continuing to several hundred or more. The time interval corresponding to a range bin is preferably less than 1 microsecond and in the illustrated embodiment is 0.4 microseconds.

In accordance with one aspect of the present invention, the amplification of the radar return signal is adjusted in accordance with the amplitude of the signal to be amplified. Thus, the gain of the return signal amplifier is desirably lower for return signals at close range than for the return signals at a greater range since the strength of the return signals at close range is normally greater. Also, where the ambient or noise level is low, the gain of the amplifier is increased to aid in the detection of small targets.

In the illustrated embodiment, arrangements are provided to generate a unique digital gain control word for each range bin. The gain control word is stored for the interpulse period and used for adjusting the gain of the radar return signal amplifier as the new return signal is received. The gain control word for a particular range bin, e.g., the 302nd range bin, is determined by detecting the return signal amplitude in the 302nd range bin from the prior transmitted radar pulse, then combining with the then existing gain control word to update that word, and storing for the interpulse period for use during the 302nd range bin. A separate gain control word is thus available for each range bin.

With continued reference to FIG. 5 and to radar pulse No. 1, the gain control word which controls the gain of the amplifier during the time interval in which the radar return signal in the 302nd range bin is received, is applied to the gain adjusting circuit of the present invention at the beginning of the time interval corresponding to that range bin and the amplifier gain is not adjusted again during the duration of that range bin. The gain may, however, be adjusted again at the beginning of the 303rd range bin, and in the illustrated embodiment a separate gain control word is provided for each range bin.

The amplitude of the return signal at the output of the amplifier is sampled during the latter part of each range bin after the gain adjusting transients have subsided. This sample is utilized as an updating signal to adjust the value of the digital gain control word for that same range bin during the reception of the next return signal from subsequently occurring transmitter pulses. The corrected or updated gain control word is stored for a time period equal to the interpulse period, and is then again utilized to adjust the gain of the amplifier at a time coinciding with the beginning of the range bin, here assumed to be the 302nd range bin, of the return signal from radar pulse No. 2. The return signal in the 302nd range bin from radar pulse No. 2 is again sampled after the gain adjustment transients have subsided and an updating signal is combined with the gain control word for the 302nd range bin then in storage to produce a new updated digital gain control word for the amplifier in amplifying the 302nd range bin the return signal from the radar pulse No. 3 (not shown).

The same procedure is followed for each of the range bins. This range bin-by-range bin adjustment of amplifier gain is accomplished for each range bin of the radar return signal independently of the value of the gain word or of the adjustment in gain of the amplifier in any of the other range bins.

B. AGC System Description

The AGC system illustrated in block form in FIG. 2 and described above in connection with FIG. 5 may take the form illustrated in FIGS. 6–10.

With reference to FIG. 6, the AGC circuit 25 includes a wide band automatic gain control amplifier (WBAGC amp) 58 connected between the radar receiver 16 and the coherent signal processor 20. The gain of the WBAGC amp 58 is determined by a binary control signal which is applied by way of the control terminals 60 to the various stages of the amp 58.

As earlier stated, the basic function of the AGC circuit 25 is to adjust the amplitude of the radar return signal to be within the dynamic range of the coherent processor 20 so that maximum sensitivity of the processor 20 can be utilized and saturation is avoided. By controlling the amplitude of its input signal, the complexity of the processor 20 is reduced and more importantly, the large variations in ground clutter closely related to antenna azimuth and strong returns from ground reflectors can be removed before the signal reaches the processor. In addition, wide variations in return signal amplitude in the same range bin for successively transmitted pulses can be accommodated by controlling the gain of the WBAGC amp 58 on a range bin-by-range bin basis. Broadly, this is accomplished by adjusting the level of amplitude of the presently received radar signal in the WBAGC amp 58 in accordance with information which has been accumulated in an integrator 70 for previous radar return signals earlier received in the time interval which defines the same range bin.

More specifically, the amplitude of the input signal from the radar receiver 16 is adjusted by the WBAGC amp 58 which, as will hereinafter be described in greater detail, comprises eight cascaded stages. The gain of each stage is individually controlled by the eight bin digital gain control signal applied to the terminals 60 from the integrator 70.

Information as to the amplitude of the return signal at the output of WBAGC amp 58 is applied to the integrator 70 by a circuit which includes a conventional wide band envelope detector 62. The detector 62 detects the envelope of the output signal from the WBAGC amp 58 and is in turn connected to a conventional sample-and-hold circuit 64. The sampled amplitude of the amplified return signal, i.e., the analog output signal from the sample-and-hold circuit 64, is converted into a digital signal in a conventional logarithmic analog-to-digital converter 66 and the digital signal related to the sampled amplitude is fed through a selector switch 68 to the integrator 70.

A feedback signal from the coherent processor 20 over line 30 may be also applied to the selector switch 68 for overriding the digital input signal when the minimum and maximum levels of the dynamic range of the coherent processor 20 are exceeded. However, a feedback signal from the coherent processor 20 on line 30 will not be present in a properly operating system and hence may be omitted.

In the preferred embodiment of the present invention, the amplitude of an incoming return signal is not used to prospectively adjust the gain of WBAGC amp 58. The sampling of the amplitude of the return signal prior to the amplification thereof and the adjustment of each gain control word before the return signal is applied to the WBAGC amp 58 is also possible in accord with the present invention. However, such an arrangement would require a delay of the return signal to be interposed between the sampling point and the WBAGC amp 58. In the illustrated embodiment, the gain control word that is used for a particular range bin of an incoming radar return signal is that which is based on the sampled amplitudes in the same range bin of the return signals from earlier radar pulses and which has been stored in the integrator 70 for an interpulse period. To update the information stored in the integrator 70 to determine the gain control signal for adjustment of the amplitude of the return signal in the same range bin from the next transmitted pulse, the envelope of the output signal of the WBAGC amp 58 is detected for each range bin by the wide band envelope detector 62 and sampled by the sample-and-hold circuit 64.

The sample-and-hold circuit 64 may be selectively gated, as is well known in the art, to avoid the transients added to the return signal by the discrete gain adjustment of the WBAGC amp 58 so that the output signal of the sample-and-hold circuit 64 is representative of the amplitude of the return signal applied to the processor 20 in a particular range bin. This amplitude signal is converted to a digital signal in the logarithmic analog-to-digital converter 66 and supplied to the selector switch 68. The analog-to-digital converter 66 is operative to convert the analog input signal to a four bit binary digital logarithmic representation (db) once every 0.4 microseconds, and to thereafter hold the digital signal for a period of 0.25 microseconds duration. The four bit binary digital output signal may be weighted on a bit-by-bit basis, in increments of 3/16 db, for example.

With continued reference to FIG. 6, the four bit digital signal from the logarithmic analog-to-digital converter 66 is fed to the selector switch 68 which optionally may also receive the limit control signal on line 30 from the coherent processor 20, as described above. In the absence of a signal on line 30, the digital signal from the logarithmic analog-to-digital converter 66 is fed to the integrator 70 through the selector switch 68 and provides a digital gain control word on terminals 80 which control the WBAGC amp 58. In the illustrated system, WBAGC amp 58 may be a 30 MHz. I. F. amplifier, with a gain that is controlled digitally over a 48 db range in 3/16 db steps. A new gain control word is applied once each 0.4 microseconds at a point in time which corresponds to each range bin. This range of gain control is provided by an 8-bit binary signal which circulates in the integrator 70.

1. The Integrator.

With continued reference to FIG. 6 and as discussed above, the integrator 70 stores, on a range bin-by-range bin basis, the updated information relating to the amplitude of previous return signals for controlling the gain adjustment of the WBAGC amp 58. The integrator 70 comprises a loop adder 74, a delay circuit 78 and a delay shift register 76. The 4-bit digital signal from the logarithmic analog-to-digital converter 66 is normally fed through the selector switch 68 to the loop adder 74 where it is added with the 8-bit digital gain control signal that was present in the delay shift register 76 controlling the gain of the WBAGC amp 58 at the time the sampled signal was passing through.

Thus, if the amplitude of the return signal detected and sampled by the sample-and-hold circuit 64 is less than a predetermined level, the 4-bit correction signal applied to the loop adder 74 will be such as to modify the 8-bit gain control word to increase the gain of the WBAGC amp 58 for the return signal from the next radar pulse during that particular range bin. Where the sampled amplitude of the return signal is above this predetermined level, the 4-bit correction signal will serve to modify the 8-bit gain control word circulating in the integrator 70 to reduce the gain of the WBAGC amp 58 for that range bin in amplifying the return signal from the next radar pulse. If the sampled amplitude is at the predetermined level, the 4-bit correction signal will not change the gain control signal.

Integrator 70, as illustrated, includes a loop adder 74 which receives the 4-bit digital output signal from the selector switch 68. The adder 74 is connected to receive also the 8-bit digital signal from the delay shift register 76. This 8-bit digital signal constituting the gain control word for each range bin established for the system is shifted through the register 76 at 0.4 microsecond intervals to correspond with the time interval associated with each range bin. After updating in loop adder 74, the gain control word is applied to the delay circuit 78 where it is delayed for the interpulse period.

In practice, the integrator circuit 70 may constitute a number of identical 8-bit shift registers equal to the number of 0.4 microsecond periods in an interpulse period. The delay shift register 76 and the loop adder 74 may be in essence two of these registers. The 8-bit gain control words may be circulated with the 8 bits either in series or in parallel. The gain control word may be modified only during the period when it is present in the loop adder 74.

The integrator 70 thus functions as a recirculating memory containing one gain control word for each range bin of the system. The 8 bits of the gain control word at the output terminals 80 of the delay shift register 76 are fed in parallel through the delay equalizer buffer 72 (see FIG. 10) to the eight-stage WBAGC amp 58 and together represent the gain adjustment desired for that particular range bin. The digital value of any particular gain control word is based on data accumulated from the amplitude of return signals from previously transmitted radar pulses for the same range bin. For example, the digital value of the gain control word associated with target signals such as signals 48 in FIG. 3 which exceed the side lobe blanking threshold, will be much greater than the values of the gain control words where there is only background noise.

By screening the digital values of the gain control words circulating in integrator 70, the range bins currently receiving signals from targets having particularly large amplitude signals can be identified along with the azimuth of the antenna (see FIG. 2). The return signals 48 from these large targets which have a tendency to provide false target indications as a result of their entry into the system via the side lobes may thus be predicted and an appropriate blanking signal generated. The blanking signal may be applied to gate 26 for the duration of the range bin and thus blank out the entire range bin for the sector of the scan where the side lobe signals are expected to appear, and this prevents the appearance of a false target due to a side lobe signal return. Even though the indicator is blanked out for a particular range over a portion of the azimuth, this result is preferred in many instances to a situation where an arcuate blur is produced.

In accordance with a further feature, the gating signal can be made selective to targets having a predetermined doppler frequency at the particular range bin involved, and thus allow all target signals to be displayed with a different doppler frequency. In this embodiment, one of the gates 28 associated with the doppler filters 22 of FIG. 2 is inhibited or its output signal gated to prevent the display of a target whose return signal originated from the side lobes of the radar beam.

The digital word from the A/D converter 66 is representative of the sampled return signal and is added to the 8-bit gain control word circulating in the integrator 70. This correction signal contains only the 4 least significant bits. Gross changes in the gain control word which may occur in response to spurious signals received are thus prevented.

Upon start up, a short period of operation is required before the gain control words circulating in integrator 70 become appropriately adjusted. In the circuit described below, where the input signal to one range bin was attenuated by 12 db, approximately five return signals were required before the gain of the WBAGC amp 58 for that range bin was increased sufficiently to produce an output signal at the same level as before the attenuation was inserted. Similarly, when the attenuation was removed, about five return signals were required before the output signal was reduced to the desired level.

The integrator 70 is thus a discrete word output device having a digital output signal. The integrator is properly synchronized with the transmitter 14 and thus performs the time based integration or signal averaging on a range bin-by-range bin basis for individual range bin control of the gain of the WBAGC amp 58.

2. Synchronism

Synchronism may be accomplished in any suitable manner. In the illustrated embodiment where the delay circuit 78 constitutes a plurality of registers equal to the number of 0.4 microsecond periods in the interpulse period, the gain control word is advanced one register each time the sample-and-hold circuit 64 operates in a manner well known to those skilled in this art. The sample-and-hold circuit may be operated by a high frequency clock which also controls the time of firing the transmitter. Alternatively, the transmission of a radar pulse may be detected and a finite number of gain control signal clocking pulses generated responsively thereto. In the alternative approach, the transmission of the radar pulses need not be periodic. In the interest of clarity and because of the conventionality of such timing circuits, the illustration thereof in the drawings has been omitted and no further description is deemed necessary.

3. WBAGC Amplifier.

As previously mentioned, the preferred embodiment of the WBAGC amplifier 58 comprises eight cascaded stages. The attenuation from maximum amplification of the radar return signal from the receiver 16 that is available by individual binary adjustment of each of the eight stages is set out in the following table:

| Stage | Attenuation |
|---|---|
| 1 | 24.0 db |
| 2 | 12.0 db |
| 3 | 6.0 db |
| 4 | 3.0 db |
| 5 | 1.5 db |
| 6 | 0.75 db |
| 7 | 0.375 db |
| 8 | 0.1875 db |

The WBAGC amplifier 58 thus provides 48 db amplitude control in 3/16th db increments. The attenuation in each stage of the WBAGC amplifier 58 is achieved by the selective enabling of a capacitive attenuator. A more detailed understanding of the operation of the WBAGC amplifier 58 may be obtained through reference to FIG. 7 wherein the schematic diagram of a circuit adaptable for each of the eight stages is illustrated. With reference now to FIG. 7, the radar return signal applied to the WBAGC amplifier 58 is applied to the base electrode of an NPN transistor Q1 whose emitter electrode is grounded through a resistor 84. The resistor 84 is shunted by a capacitor 86 in series with a switch A, the operation of which will hereinafter be described in more detail in connection with FIG. 9.

The collector and base electrodes of the transistor Q1 are connected respectively to an appropriate source of bias potential through resistors 88 and 90. The output signal of the transistor Q1 is taken from the collector electrode and is passed through a pair of capacitors 92 and 94 to the base electrode of a second NPN transistor Q2. The collector and base electrodes of the transistor Q2 are appropriately biased through resistors 96 and 98, and the emitter electrode thereof grounded through a resistor 100. The output signal of the stage is taken across the resistor 100 from the terminal 102 at the emitter electrode. The interconnection 104 of the two capacitors 92 and 94 is grounded through a capacitor 106 in series with a switch B, the operation of which will hereinafter be more fully described in connection with FIG. 8.

Both switch A and switch B are controlled by the selective application of one or more bits of the 8-bit gain control word to the appropriate control terminal 60 from the delay equalizer buffer 72, as will be more fully described in connection with FIG. 10.

Switch B of the circuit of FIG. 7 is utilized for the switching of the major attenuation element, i.e., capacitor 106, into and out of the various stages of the WBAGC amplifier 58. The optional inclusion of switch A allows the exercise of a finer control by the selective introduction of a smaller attenuator, i.e., capacitor 86, to the collector-emitter circuit of the transistor Q1.

It has been found that the utilization of a conventional transistor or diode switching circuit for switch B is unsatisfactory by reason of excessive recovery time. The preferred embodiment thus utilizes a switch of the type illustrated in FIG. 8 wherein the appropriate bit of the digital gain control word is applied through a pair of inverters 110 and 112 and thereafter through a resistor 114 and a capacitor 116 connected in parallel to the base electrode of an NPN transistor Q3. The collector electrode of the transistor Q3 is coupled to the base electrode thereof by way of resistors 118 and 120, and is coupled to the terminal 104 in the circuit of FIG. 7 by way of the capacitor 106. The emitter electrode of the transistor Q3 is grounded and the collector-to-emitter path thereof is paralleled by a diode 124. Biasing resistors 126 and 128 and an isolating capacitor 132 are provided. While the theory of operation of the circuit of FIG. 8 is not completely understood, the recovery time of the switching circuit with the addition of the diode 124 has been found far superior to other switching circuits considered.

Typical values for the various circuit components of FIG. 8 are as follows:

| | |
|---|---|
| inverters 110 and 112 | SN 7401 N |
| diode 124 | HP 2301 |
| transistor Q3 | 3646 |
| resistors 120 and 126 | 1.2 K ohms |
| resistors 114 | 5.6 K ohms |
| resistors 118 | 2.2 K ohms |
| capacitor 132 | 2 picofarads |
| capacitor 106 | 3 picofarads |

The switch A shown in FIG. 7 is illustrated in greater detail in FIG. 9. Referring now to FIG. 9, an appropriate bit of the digital gain control word is applied through an inverter 134 and a resistor 136 to the base electrode of an NPN transistor Q4. The emitter electrode of the transistor Q4 is grounded and the collector electrode thereof is coupled to the terminal 122 in FIG. 7 at the emitter electrode of the transistor Q1 by way of the capacitor 86. The base electrode of the transistor Q4 is connected to an appropriate source of bias potential through a resistor 138.

Typical values for the various circuit components of the circuit of FIG. 9 are as follows:

| | |
|---|---|
| inverter 134 | SN 7401 N |
| transistor Q4 | 3646 |
| resistor 136 | 6.6 K ohms |
| resistor 138 | 1.2 K ohms |

With reference again to FIG. 6, the signals applied to the input terminals 60 of the WBAGC amplifier 58 are derived in parallel from the conventional delay shift register 76 of the integrator 70, but are delayed in the delay equalizer buffer 72 so that the transients associated with the switching of the attenuation into and out of the various stages of the amplifier 58 will be superimposed on the transients associated with the switching in the preceding stages of the amplifier 58 as the radar return signal passes through the eight stages thereof.

4. Transient Superimposition.

The switching of the attenuation into and out of the amplifier stage results in the unavoidable generation of transients. The frequency response of the WBAGC amplifier 58 is necessarily wide band and hence the switching transients are passed. By providing the delay equalizer buffer 72 with separate signal channels having different delays, all of the switching transients may be confined to the same approximately 0.1 microseconds portion of a 0.4 microsecond range bin. The delay equalizer buffer 72 introduces successive delays in terms of nanoseconds into the application of successive bits of the 8-bit digital gain control word to the cascaded stages of the WBAGC amplifier 58 so that the transient generated in each stage will be superimposed on the transients generated in the preceding stages as the radar return signal passes through the WBAGC amplifier 58.

The delay equalizer buffer is shown in detail in FIG. 10 and with reference thereto, seven of the eight bits of the digital gain control word are applied from the delay shift register 76 through successive delay circuits D 1–D24, as indicated in the figure, to the respective stages of the WBAGC amplifier 58. Each of the delay circuits D1–D24 comprises an inverter, a resistor, and a capacitor. The resistance associated with each of the delay circuits D1–D24 may be the same value, e.g., 1.2 K ohms, and the inverters may likewise be all of the same type, e.g., 7440 N transistors. The capacitors vary, however, in value, as indicated in the following table:

| | |
|---|---|
| D1–D6, D9, D10, D13, D14, D16–D18, and D22 | 33 microfarads |
| D7 | 10 microfarads |
| D8 | 12 microfarads |
| D11 | 22 microfarads |
| D12 | 15 microfarads |
| D15, D21 | Zero microfarads |

The departures from the foregoing include stage 1 of the amplifier 58 which is always provided with a binary ZERO input signal, and stages 2–4 which receive bit 8, as applied through series-connected NAND gates 140 and 142. The NAND gate 140 has two input terminals. Bit 8 is applied directly to one input terminal and through a NAND gate 144 and an inverter 146 to the other input terminal. The NAND gates 140, 144, and 146 may, for example, be of the type 74 H 10 N, and the inverter 146, as well as the inverters associated with the terminals associated with the eight stages of the amplifier 58, may be, for example, type 740 1N.

V. ADVANTAGES AND SCOPE OF INVENTION

The present invention obviates many of the difficulties of known MTI systems in the elimination of false targets without sacrificing legitimate targets. Stationary targets detected in the main beam which provide an echo sufficiently large to enter the system through detection in one or more of the side lobes are tracked in range and the signal processor inhibited in the appropriate range bin when the antenna rotates sufficiently to place the target within the side lobes. False target returns are thus prevented from entering the radar processor through the side lobes.

In addition to the tracking in range of targets which might enter the radar processor through the side lobes, the present invention calculates the doppler frequency that the spurious returns will have when detected in the side lobes and inhibits only the appropriate doppler filter. In this way other legitimate targets at the same range but having a different doppler frequency due to the position thereof in the main beam may enter the radar system.

These legitimate main beam targets are not sacrificed in the elimination of side lobe false targets at the same range.

The automatic gain control feature of the present invention as above described dynamically adjusts the amplification of the return signals from successive radar pulses on a range bin-by-range bin basis. By dividing the return signal from each radar pulse into a very large number, e.g., 1280, of small range bins, and by control of the amplification of the return signal in each of the range bins only on the basis of the sampled amplitude of the return signal from earlier radar pulses in the same range bin, a degree of amplitude control heretofore unknown has been achieved permitting far greater sensitivity and thus target resolution. The effects of spurious signals are limited but the system rapidly responds to a large change in the return signal in a particular range bin, e.g., in the transition from overwater to overland searching.

By use of a digital gain control signal, the storage of the gain control word provides information readily usable for cancelling spurious signals entering the system through the side lobes of the radar. Also, this provides an almost instantaneous dynamic range control in addition to the dynamic range of the amplifier. With 1280 range bins, the digital integrator loop operates with 1280 8-bit numbers to provide the desired independent AGC action on each separate range bin.

The digital control of the return signal amplifier by the application of various bits of the gain control signal to various stages of the amplifier permits a very fine control of amplifier gain as well as superimposition of the gain modification transients on a small portion of each range bin so that processing of the return signal may be restricted to the larger portion thereof and thus enhanced.

The same concepts may be used for extending and controlling a communication receiver dynamic range while matching "dynamic range" interfaces with the signal processor.

The identification of the signals representing the stationary targets in a radar return signal, not only permits the effective elimination thereof in an AMTI system, but permits the radar mapping of an area without the spurious effects of moving targets. The automatic gain control feature of the present invention prevents saturation of the radar signal processor and a far greater sensitivity in such mapping.

The present invention may thus be embodied in other specific forms witout departing from the spirit or essential characteristics thereof. The presently disclosed embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A radar system comprising:
   means for transmitting a succession of radar pulses separated by an interpulse period;
   means including an amplifier for receiving a return signal from each of said transmitted radar pulses;
   means for sampling the amplitude of the return signal from each of the transmitted radar pulses in a plurality of range bins during the interpulse period;
   means for varying the gain of said amplifier for the return signal from one of said transmitted radar pulses in each of said plurality of range bins in response to the sampled amplitude in the corresponding range bin of the return signal from a prior one of said transmitted radar pulses;
   means for removing the effects of radar platform movement from the main beam targets;
   a bank of doppler filters;

an indicator;

means for detecting targets in the main beam having an amplitude exceeding a predetermined value;

means for effectively inhibiting selected ones of said doppler filters in response to said main beam target detecting means;

means for tracking targets detected in the main beam and having sufficient reflective power to override side lobe attenuation;

means for calculating the residual doppler frequency of said targets resulting from side lobe rather than main beam detection; and, means responsive to said calculating means for inhibiting selected ones of said doppler filters corresponding to the calculated doppler frequency for the range of said targets.

2. The system of claim 1 wherein said gain varying means includes:

means for converting the sampled amplitude of the amplified return signal from said prior one of said transmitted radar pulses in each of said plurality of range bins into a digital signal;

means for storing said digital signals for a period of time substantially equal to an integral multiple of said interpulse period; and, means for sequentially applying said stored digital signals to said amplifier to vary the gain of said amplifier for each of said plurality of range bins independently of the gain of the said amplifier for the return signal from said one of said transmitted radar pulses.

3. The system of claim 1 wherein said sampled amplitude is converted into a digital gain control signal; and, wherein said amplifier comprises a plurality of amplification stages connected in cascade, each of said plurality of amplification stages having a predetermined gain and including circuit means for reducing said predetermined gain by a predetermined amount in response to said digital gain control signal.

4. The system of claim 3 wherein said circuit means comprises a capacitor and switch means actuatable by different voltage levels of said digital gain control signal, said switch means including a transistor and a diode connected in parallel.

5. The radar system of claim 1 wherein said amplifier includes at least three cascaded amplification stages; and, wherein said gain varying means includes:

means for generating a plural bit binary gain control signal representative of the selected degree of amplification with different ones of the bits of said gain control signal being connected to control in discrete levels the gain of different ones of said amplification stages; and, means for delaying the bits of said gain control signal by increments of time corresponding to the increments of time required for the analog signal to pass through the cascaded amplification stages preceding the stage which each of the bits of the gain control signal controls whereby transients generated by the discrete adjustments in the degree of amplification of each of said amplification stages of said amplifier are superimposed on the same portion of the analog signal.

6. An airborne moving target indicator comprising:
an airborne radar platform;

a radar system carried by said platform including a transmitter, receiver, transmit-receiver switch, digital automatic gain control circuit, and an indicator;

means for modifying the doppler frequencies of the output signal of said radar receiver in response to movement of said radar platform;

means for tracking relative to the side lobes the main beam detected targets having sufficient reflective power to overcome side lobe attenuation;

means responsive to said tracking means for calculating the doppler of targets detected in the side lobes after said modification of the doppler frequencies;

a plurality of doppler filters interconnected between said receiver and said indicator;

means responsive to said calculating means for inhibiting less than all of the doppler filters.

7. The indicator of claim 6 wherein said digital automatic gain control circuit comprises:

means for amplifying the output signal from said receiver;

means for sampling the amplitude of the amplified output signal during a plurality of range bins in the interpulse period; and, means for varying the degree of amplification of the output signal in each of said plurality of range bins in response to the sampled amplitude of the output signal from a prior transmitted radar pulses in the corresponding range bin, the degree of amplification of the output signal from each transmitted radar pulse in each of said plurality of range bins being independent of the amplification of the output signal in any other of said plurality of range bins.

8. The indicator of claim 7 wherein the degree of amplification varying means includes:

means for converting the sampled amplitude of the output signal in each of said plurality of range bins into a digital signal; and, means for storing said digital signals for a period of time not substantially less than an interpulse period.

9. A method of separating the return signals from moving targets from the return signals from stationary target in a doppler radar system comprising the steps of:

a. transmitting a succession of radar pulses separated by an interpulse period;

b. detecting the return signal from each of the transmitted radar pulses;

c. dividing the interpulse period into a plurality of discrete range bins;

d. sampling the amplitude of the return signal from each of the succession of transmitted radar pulses in each of the discrete range bins;

e. varying the amplification of the return signal in each of the plurality of discrete range bins from each of the transmitted radar pulses in response to the sampled amplitude in the corresponding one of the plurality of discrete range bins of the return signal from a preceding one of the transmitted radar pulses, the variation in amplification of the return signal in each of the plurality of discrete range bins being independent of the amplification in the others of the plurality of discrete range bins of the same return signal to thereby reduce the amplitude variations in the radar return signal;

f. detecting discrete targets in the main beam of the radar system having sufficient reflective power to generate false alarms through entry into the radar system through a side lobe;

g. tracking the discrete targets relative to a side lobe;
h. calculating the doppler frequency of the discrete targets when in the side lobes;
i. processing the amplified return signals on the basis of the phase shift between successive return signals from the same target to separate moving targets from stationary targets; and,
j. inhibiting less than all of the doppler filters responsively to the doppler frequency calculation at the range of the side lobe target when the detected discrete target is in the side lobe of the radar system to thereby reduce false alarms.

10. The method of claim 9 wherein the amplification of the return signal in each of the plurality of discrete range bins from each of the transmitted radar pulses is varied in accordance with the sampled amplitude in the corresponding one of the plurality of discrete range bins of the return signals from a plurality of the immediately preceding transmitted radar pulses.

11. The method of claim 9 further comprising the step of storing the sampled amplitudes for a period of time substantially equal to an interpulse period; and,
wherein the amplification in each of the plurality of discrete range bins of the return signal from a transmitted radar pulse is varied in accordance with the sampled amplitude in the corresponding range bin of the return signal from the immediately preceding one of the transmitted radar pulses.

12. A radar system comprising:
means for transmitting a succession of radar pulses separated by an interpulse period;
means including an amplifier for receiving a return signal from each of said transmitted radar pulses;
means for sampling the amplitude of the return signal from each of the transmitted radar pulses in a plurality of range bins during the interpulse period; and,
means for varying the gain of said amplifier for the return signal from one of said transmitted radar pulses in each of said plurality of range bins in response to the sampled amplitude in the corresponding range bin of the return signal from a prior one of said transmitted radar pulses.

13. The system of claim 12 wherein said gain varying means includes:
means for converting the sampled amplitude of the amplified return signal from said prior one of said transmitted radar pulses in each of said plurality of range bins into a digital signal;
means for storing said digital signals for a period of time substantially equal to an integral multiple of said interpulse period; and,
means for sequentially applying said stored digital signals to said amplifier to vary the gain of said amplifier for each of said plurality of range bins independently of the gain of the said amplifier for the return signal from said one of said transmitted radar pulses.

14. The system of claim 12 wherein said sampled amplitude is converted into a digital gain control signal; and,
wherein said amplifier comprises a plurality of amplification stages connected in cascade,
each of said plurality of amplification stages having a predetermined gain and including circuit means for reducing said predetermined gain by a predetermined amount in response to said digital gain control signal.

15. The system of claim 14 wherein said circuit means comprises a capacitor and switch means actuatable by different voltage levels of said digital gain control signal, said switch means including a transistor and a diode connected in parallel.

16. The radar system of claim 12 wherein said amplifier includes at least three cascaded amplification stages; and,
wherein said gain varying means includes:
means for generating a plural bit binary gain control signal representative of the selected degree of amplification with different ones of the bits of said gain control signal being connected to control is discrete levels the gain of different ones of said amplification stages; and,
means for delaying the bits of said gain control signal by increments of time corresponding to the increments of time required for the analog signal to pass through the cascaded amplification stages preceding the stage which each of the bits of the gain control signal controls whereby transients generated by the discrete adjustments in the degree of amplification of each of said amplification stages of said amplifier are superimposed on the same portion of the analog signal.

17. A radar system comprising:
means for transmitting a succession of radar pulses separated by an interpulse period;
means for receiving and amplifying a return signal from each of said transmitted radar pulses;
means for sampling the amplitude of the amplified return signal from each of said transmitted radar pulses during a plurality of range bins in the interpulse period; and,
means for varying the degree of amplification of the return signal in each of said plurality of range bins in response to the sampled amplitude of the return signal from a prior one of said transmitted radar pulses in the corresponding range bin, the degree of amplification of the return signal from each of said transmitted radar pulses in each of said plurality of range bins being independent of the amplification of the return signal in any other of said plurality of range bins.

18. The system of claim 17 wherein the gain varying means includes:
means for converting the sampled amplitude of the return signal in each of said plurality of range bins into a digital signal; and,
means for storing said digital signals for a period of time not substantially less than an interpulse period.

19. A doppler radar system comprising:
means for transmitting a succession of radar pulses separated by substantially equal interpulse periods;
means for amplifying the return signal from each of said transmitted radar pulses;
a return signal processor for processing the amplified return signal from each of said transmitted radar pulses;
means for establishing a signal level related to the amplitude of the return signal from each of said transmitted radar pulses in a plurality of range bins during the interpulse periods; and
means responsive to said established signal levels for adjusting the gain of said amplifying means for each of said plurality of range bins independently of the gain of said amplifying means for the others of said plurality of range bins.

20. The doppler radar system of claim 19 wherein said range bins are less than one microsecond in duration.

21. The doppler radar system of claim 19 wherein said amplifying means includes at least three amplification stages; and,
wherein said gain adjusting means includes:
means for generating a plural bit binary gain control signal representative of the selected degree of amplification with different ones of the bits of said gain control signal being connected to control in discrete levels the gain of different ones of said amplification stages; and,
means for delaying the bits of said gain control signal by increments of time corresponding to the increments of time required for the analog signal to pass through the cascaded amplification stages preceding the stage which each of the bits of the gain control signal controls whereby transients generated by the discrete adjustments in the degree of amplification of each of said amplification stages of said amplifier are superimposed on the same portion of the analog signal.

22. The doppler radar system of claim 21 wherein said range bins are less than one microsecond in duration.

23. A system for automatically controlling the amplitude of the return signals applied to the return signal processor of a doppler radar system comprising:
a source of the return signal from each of a succession of radar pulses;
a processor for return signals; and
circuit means for applying said return signals from said source to said processor, said circuit means including:
an amplifier,
means for detecting the amplitude of the radar return signal in each of a plurality of discrete range bins, and
means connected to said return signal amplitude detecting means for generating a digital control signal for each of said discrete range bins in response to the detected amplitude of the return signals in the corresponding range bins from a plurality of preceding radar pulses;
the gain of said amplifier for each of said plurality of discrete range bins being responsive to said digital control signals independently of the gain of said amplifier for each of the other of said plurality of discrete range bins to thereby provide independent control of the amplification of the return signal from each radar pulse in each of said plurality of discrete range bins.

24. The system of claim 23 wherein said digital control signal generating means comprises summing means, delay means, and a delay shift register connected in series.

25. The system of claim 24 wherein said digital control signal includes a plurality of bits; and,
wherein said control signal generating means further includes means for delaying different bits of said control signals for different periods of time.

26. The system of claim 25 wherein said amplifying means includes a plurality of amplification stages connected in cascade,
each of said amplification stages having a predetermined gain and having means for reducing said pedetermined gain by a predetermined amount in response to the application of a plural bit digital gain control signal.

27. The system of claim 26 wherein said gain reducing means comprises a capacitor and switch means responsive to at least one bit of said digital gain control signal, said switch means including a transistor and a diode connected in parallel.

28. A method of separating the return signals from moving targets from the return signals from stationary target in a doppler radar system comprising the steps of:
a. transmitting a succession of radar pulses separated by an interpulse period;
b. detecting the return signal from each of the transmitted radar pulses;
c. dividing the interpulse period into a plurality of discrete range bins;
d. sampling the amplitude of the return signal from each of the succession of transmitted radar pulses in each of the discrete range bins;
e. varying the amplification of the return signals in each of the plurality of discrete range bins from each of the transmitted radar pulses in response to the sampled amplitude in the corresponding one of the plurality of discrete range bins of the return signal from a preceding one of the transmitted radar pulses, the variation in amplification of the return signal in each of the plurality of discrete range bins being independent of the amplification in the others of the plurality of discrete range bins of the same return signal to thereby reduce the amplitude variations in the radar return signal; and,
f. processing the amplified return signals on the basis of the phase shift between successive return signals from the same target to separate moving targets from stationary targets.

29. The method of claim 28 wherein the amplification of the return signal in each of the plurality of discrete range bins from each of the transmitted radar pulses is varied in accordance with the sampled amplitude in the corresponding one of the plurality of discrete range bins of the return signals from a plurality of the immediately preceding transmitted radar pulses.

30. The method of claim 28 further comprising the step of storing the sampled amplitudes for a period of time substantially equal to an interpulse period; and,
wherein the amplification in each of the plurality of discrete range bins of the return signal from a transmitted radar pulse is varied in accordance with the sampled amplitude in the corresponding range bin of the return signal from the immediately preceding one of the transmitted radar pulses.

31. The method of claim 28 wherein the step of varying the amplification of the return signal is effected by:
a. providing an amplifier having plural cascaded stages;
b. generating a plural bit binary signal representative of the selected amplification;
c. delaying different bits of the binary signal by different amounts;
d. applying different ones of the delayed bits of the binary signal to different ones of the cascaded stages to vary the gain thereof in discrete amounts; and,
e. passing the analog signal through the cascaded stages of the amplifier.

32. The method of claim 31 wherein all of the bits applied to each stage of the amplifier are delayed for a time interval substantially equal to the delay of the analog signal resulting from the passage of the analog signal through the preceding stages of the amplifier whereby transients generated by the discrete variation in the gain of each of the stages is superimposed on the same portion of the analog signal.

33. A method of varying the amplification of the return signal from a radar pulse comprising the steps of:
   a. transmitting a first radar pulse;
   b. detecting the return signal from the first radar pulse;
   c. periodically sampling the amplitude of the detected return signal from the first radar pulse;
   d. converting said sampled amplitude signal into a digital gain control signal;
   e. storing the digital gain control signal;
   f. transmitting a second radar pulse;
   g. detecting the return signal from the second radar pulse; and,
   h. selectively varying the amplification of the detected return signal from the second radar pulse responsively to each of the stored gain control signals derived from the return signal from the first radar pulse.

34. The method of claim 33 wherein the storage of the gain control signals is for a period of time substantially equal to an integral multiple of the time interval between the transmission of first and second radar pulses.

35. A method of varying the amplification of the return signal from a succession of radar pulses comprising the steps of:
   a. dividing the time interval between successive radar pulses into a plurality of range bins;
   b. sampling the amplitude of the return signal from each radar pulse in each of the range bins; and,
   c. varying the amplification in each range bin of the return signal from one radar pulse independently of the amplification of the return signal in the other range bins in response to the sampled amplitude of the corresponding range bin of the return signal from a preceding radar pulse.

36. The method of claim 35 including the steps of:
   converting the sampled amplitudes of the return signal in each of the range bins into a digital gain control signal;
   storing the digital gain control signal for a period of time substantially equal to an integral multiple of the time interval between successive radar pulses; and,
   varying the amplification of the return signal from a subsequent radar pulse in each range bin in response to the gain contral signal derived from the corresponding range bin of the return signal from a preceding radar pulse.

37. The method of claim 36 wherein the storing of the gain control signals derived from each of the successive range bins of the return signal from one radar pulse is effected by:
   providing a first in, first out memory having a storage capacity sufficient to store the digital control signals for all of the range bins in the interval between two successive radar pulses;
   circulating the gain control signals through said memory; and,
   up-dating the gain control signal for each range bin during reception of each radar return signal by combining the digital gain control signal for each range bin with the digital gain control signal for the corresponding range bin of the return signal from the immediately preceding radar pulse.

38. The method of claim 37 including the step of restricting the variation in the amplification in the same range bin of the return signal from two successive radar pulses to within predetermined limits.

39. The method of claim 38 wherein the step of varying the amplification of the return signal is effected by:
   a. providing an amplifier having plural cascaded stages;
   b. generating a plural bit binary signal representative of the selected amplification;
   c. delaying different bits of the binary signal by different amounts;
   d. applying different ones of the delayed bits of the binary signal to different ones of the cascaded stages to vary the gain thereof in discrete amounts; and,
   e. passing the analog signal through the cascaded stages of the amplifier.

40. The method of claim 39 wherein all of the bits applied to each stage of the amplifier are delayed for a time interval substantially equal to the delay of the analog signal resulting from the passage of the analog signal through the preceding stages of the amplifier whereby transients generated by the discrete variation in the gain of each of the stages is superimposed on the same portion of the analog signal.

41. Apparatus comprising:
   means for transmitting a succession of radar pulses separated by an interpulse period;
   means including an amplifier for receiving a return signal from each of said transmitted radar pulses;
   means for sampling the amplitude of the return signal from each of the transmitted radar pulses in a plurality of range bins during the interpulse period;
   means for varying the gain of said amplifier for the return signal from one of said transmitted radar pulses in each of said plurality of range bins in response to the sampled amplitude in the corresponding range bin of the return signal from a prior one of said transmitted radar pulses; and,
   means for storing the up-dated gain control signal for controlling the gain of said amplifier for the next radar return signal.

42. The apparatus of claim 41 wherein said amplifier includes at least three cascaded amplification stages; and,
   wherein said gain varying means includes;
      means for generating a plural bit binary gain control signal representative of the selected degree of amplification with different ones of the bits of said gain control signal being connected to control in discrete levels the gain of different ones of said amplification stages; and,
      means for delaying the bits of said gain control signal by increments of time corresponding to the increments of time required for the analog signal to pass through the cascaded amplification stages preceding the stage which each of the bits of the gain control signal controls whereby transients generated by the discrete adjustments in the degree of amplification of each of said amplification stages of said amplifier are superimposed on the same portion of the analog signal.

43. A method of separating the return signals from moving targets from the return signals from stationary target in a doppler radar system comprising the steps of:

a. transmitting a succession of radar pulses separated by an interpulse period;
b. detecting the return signal from each of the transmitted radar pulses;
c. dividing the interpulse period into a plurality of discrete range bins;
d. sampling the amplitude of the return signal from each of the succession of transmitted radar pulses in each of the discrete range bins;
e. varying the amplification of the return signal in each of the plurality of discrete range bins from each of the transmitted radar pulses in response to the sampled amplitude in the corresponding one of the plurality of discrete range bins of the return signal from a preceding one of the transmitted radar pulses, the variation in amplification of the return signal in each of the plurality of discrete range bins being independent of the amplification in the others of the plurality of discrete range bins of the same return signal to thereby reduce the amplitude variations in the radar return signal;
f. processing the amplified return signals on the basis of the phase shift between successive return signals from the same target to separate moving targets from stationary targets; and,
g. recording to stationary targets.

44. In an AEW MTI having a radar system, means for removing the effects of radar platform movement from the main beam targets, a bank of doppler filters and an indicator, the improvement comprising:
means for tracking targets detected in the main beam and having sufficient reflective power to override side lobe attenuation;
means for calculating the residual doppler frequency of said targets resulting from side lobe rather than main beam detection; and
means responsive to said calculating means for inhibiting selected ones of the doppler filters corresponding to the calculated doppler frequency for the range of said targets.

45. The system of claim 44 including:
means for measuring the velocity vector of the platform, the bearing of said targets from the normal to the velocity vector for the platform, and the wave length of the energy transmitted by the radar system.

46. A method of reducing overland false alarms in an AEW system having a radar system, an array of doppler filters and an indicator comprising the steps of:
a. detecting discrete targets in the main beam of the radar system having sufficient reflective power to generate false alarms through entry into the radar system through a side lobe;
b. tracking the discrete targets relative to the side lobe;
c. modifying the doppler frequencies of the discrete targets responsively to radar system platform movement;
d. calculating the residual doppler frequency of the targets when in the side lobes; and
e. inhibiting less than all of the doppler filters responsively to the calculation at the range of the side lobe target to thereby reduce false alarms.

47. A method reducing the interference of ground clutter in a doppler radar system comprising the steps of:
a. detecting the main lobe radar signal and the ground clutter entering the system through a side lobe of the antenna;
b. splitting the detected ground clutter into a plurality of doppler channels;
c. computing the ground doppler; and,
d. tuning the clutter rejection circuits responsively to the computed ground doppler so that target echoes do not have to compete with side lobe clutter.

48. The method of claim 47 including the further step of arithmetically processing the detected radar signal.

49. Apparatus for reducing the interference of ground clutter in a doppler radar system comprising:
means for detecting the main lobe radar signal and the ground clutter entering the system through a side lobe of the antenna;
means for splitting the detected ground clutter into a plurality of doppler channels;
means for computing the ground doppler; and,
means for tuning the clutter rejection circuits responsively to the computed ground doppler so that target echoes do not have to compete with side lobe clutter.

50. The apparatus of claim 49 including means for arithmetically processing the detected radar signal.

51. A system for automatically controlling the amplitude of signals applied to a radar signal processor comprising:
a source of successive radar return signals;
a radar signal processor;
amplifier means connected between said source and said processor for amplifying said radar signals and for applying said amplified radar signals to said processor;
detector means for detecting the amplitude of said radar signals; and
gain control means responsive to said detector means for selectively adjusting the gain of said amplifier means, said gain adjusting means being independently adjustable for each of a plurality of discrete time intervals related to each of said radar signals whereby the gain of said amplifier means is independently adjustable for each time interval of one of said radar signals responsively to the detected amplitude of a related time interval of the preceding one of said radar signals.

52. The system of claim 51 wherein said amplifier has a plurality of cascaded stages, the gain of each of said stages being adjustable independently of the other of said stages.

53. The system of claim 52 wherein said gain control means includes means for synchronizing the adjustment of the gain of each of said stages with the passage of said radar signals through said amplifier means so that transients generated in the adjustment of each of said stages will coincide with the same portion of said radar signals during each of said discrete time intervals.

54. The system of claim 51 wherein said detector means includes a gated envelope detector.

55. The system of claim 51 wherein said gain control means includes means for generating a digital multiple bit gain control word for each of said discrete time intervals.

56. The system of claim 55 wherein said amplifier means has a plurality of cascaded stages, the gain of each of said stages adjustable independently of the other of said stages, each of said stages being responsive to a bit of said digital gain control word.

57. The system of claim 51 wherein said radar signals are analog signals and wherein said detector means includes a logarithmic analog to digital converter.

58. The system of claim 57 wherein said gain control means includes means for generating a digital multiple bit gain control word for each of said discrete time intervals and means for modifying said gain control word responsive to said analog to digital converter.

59. The system of claim 58 wherein said gain control means includes digital storage means having a storage capacity equal to the number of said discrete time intervals in a radar return signal multiplied by the number of bits in the digital gain control word.

60. The system of claim 51 wherein said gain control means includes means for integrating the detected amplitude over a plurality of radar return signals.

61. A method for adjusting the amplitude of radar return signals to optimize target discrimination by a radar processor comprising the steps of:
   a. individually detecting the amplitude of a radar return signal during a plurality of discrete time increments; and
   b. adjusting the amplitude of the radar return signal during said discrete time increments of each radar return signal independent of other increments of that radar return signal and in response to the amplitude detected for corresponding time increments of a previous radar return signal.

62. The method of claim 61 further comprising the steps of:
   generating a digital word representative of the detected amplitude of each of the plurality of discrete time increments;
   adding the digital word to previously generated digital words for corresponding time increments of previous radar return signals to form a corrected digital word; and
   adjusting the amplitude of the corresponding time increments of a subsequently received radar return signal responsively to the corrected digital word.

63. The method of claim 62 wherein the digital words comprise a numeral in binary form with bits of different orders having different weights.

64. The method of claim 63 including the further step of selectively delaying the application of the bits of the digital word to superimpose the switching transients on the same time portion of each increment of the radar return signal.

65. The method of claim 63 wherein the generated digital word has fewer orders of bits than the corrected digital word to prevent gross changes in magnitude of the corrected digital word due to the detection of spurious return signals.

66. A moving target indicator comprising:
   a radar platform;
   a radar system carried by said platform including a transmitter, receiver, transmit-receive switch, and an indicator;
   means for modifying the doppler frequencies of the output signal of said radar receiver in response to movement of said radar platform;
   means for tracking relative to the side lobes the main beam detected targets having sufficient reflective power to overcome side lobe attenuation;
   means responsive to said tracking means for calculating the doppler of targets detected in the side lobes after said modification of the doppler frequencies;
   a plurality of doppler filters interconnected between said receiver and said indicator; and
   means responsive to said calculating means for inhibiting less than all of the doppler filters.

* * * * *